United States Patent [19]
Rafael

[11] 3,909,417
[45] Sept. 30, 1975

[54] DEVICE FOR DAMPING THE SURGE OF WATER WAVES PARTICULARLY FOR A FLOATING BODY DESIGNED TO CLEAN POLLUTED WATER

[76] Inventor: Johann Rafael, Maxstrasse 36, Salzburg, Austria

[22] Filed: Sept. 25, 1973

[21] Appl. No.: 400,632

[30] Foreign Application Priority Data
Sept. 25, 1972 Germany............................ 2246957

[52] U.S. Cl............................. 210/242; 210/DIG. 21
[51] Int. Cl.² ......................................... E02B 15/04
[58] Field of Search............. 61/1 F, 5; 210/83, 242, 210/DIG. 21

[56] References Cited
UNITED STATES PATENTS

| | | | |
|---|---|---|---|
| 3,565,254 | 2/1971 | Latimer .......................... | 210/242 X |
| 3,595,392 | 7/1971 | Markel ...................... | 210/DIG. 21 X |
| 3,630,376 | 12/1971 | Price .................................. | 210/242 |
| 3,651,943 | 3/1972 | Perna ................................. | 210/242 |
| 3,656,619 | 4/1972 | Ryan et al............................ | 210/83 |
| 3,662,891 | 5/1972 | Headrick ............................. | 61/5 X |
| 3,684,095 | 8/1972 | Ayers ...................... | 210/DIG. 21 X |

*Primary Examiner*—Paul R. Gilliam
*Assistant Examiner*—David H. Corbin
*Attorney, Agent, or Firm*—Fleit & Jacobson

[57] ABSTRACT

A device for damping the surge of water waves on a floating body designed to clean polluted water, the damping body being pivotably hinged as an outrigger onto the floating body and the damping body having a fin which extends substantially parallel to the surface of the water, and the damping body being connected to a damping feature for the oscillations caused by the water waves.

8 Claims, 3 Drawing Figures

DEVICE FOR DAMPING THE SURGE OF WATER WAVES PARTICULARLY FOR A FLOATING BODY DESIGNED TO CLEAN POLLUTED WATER

The invention relates to a device for damping the surge of water waves, particularly for a floating body designed to clean polluted water.

Especially for so-called cleaning ships which are employed to clean water polluted by oil for example, the possibility of use if frequently made difficult or even impossible when there is a moderate surge. In the case of accidents on the open sea it is therefore not possible in most cases to clean the water surface polluted by oil because the surge is too strong. For in order to remove efficiently the oil floating on the water surface, it is necessary to peel off only a certain thickness of the polluted water surface and to guide it into the cleaning ship. Even when the surge is moderate only, it is therefore hardly possible to remove efficiently the oil on the surface of the water.

The object of the invention is therefore to provide a device with which the oil-polluted water can be cleaned even when the sea is aroused and the surge is relatively strong.

This object is achieved by a device for damping the surge of water waves, particularly for a floating body desigend to clean polluted water, according to the invention wherein a pivotable damping body furnished with a fin is provided which can be immersed either partly or fully in the water and whose oscillating motions caused by the water waves are damped.

The damping action of the damping body can be increased when the longitudinal section of the fin has the shape of a damped sinusoidal wave. This is achieved in that the fin damps the oncoming wave with as little shock as possible.

For the purpose of partly immersing the damping body use may be made of floating bodies which are so buoyant that the weight of the damping body is immersed by roughly half. When a wave approaches, the damping body is also raised together with the floating bodies, the pivoting movment of the damping body being so adjusted, however, by means of a damping device for example that upon the passage of the full amplitude of the water wave the front edge of the damping body just about assumes the level of that amplitude.

The damping body may be designed as a front attachment to a cleaning ship which serves to clean oil-polluted water. Further, it is advantageous to so design the damping body that it can be folded back in the direction of the deck of the cleaning ship. Further, the damping body may be mounted pivotably on the peeling body at the inlet opening of the cleaning ship. This means that the inlet opening for the polluted water is limited upwardly by the fin of the damping body and downwardly by the peeling body with which the thickness of the water coat to be peeled of the surface of the water is ajdusted. To this end the swivel axis of the damping body may be roughly on the same level as the top limit of the inlet opening. The damping body can be joined to the peeling body by means of streamlined bodies having corresponding fins. These streamlined bodies also serve to align the flow direction of the polluted water flowing through the inlet opening.

The invention affords the advantage that the limit of the possible surge at which it is still possible to work is shifted upwards in accordance with the amplitude and wavelength so that the cleaning work can be done even when the sea is aroused. This is of sepcial importance for accidents on the open sea in particular. A further factor achieved with the invention is that oncoming waves are damped and the oil-covered surface layer is guided into the inlet opening of the cleaning ship, the clean water then being forced away to the left and right.

The invention is explained in more detail with reference to an embodiment and the attached drawings.

Figure 1:
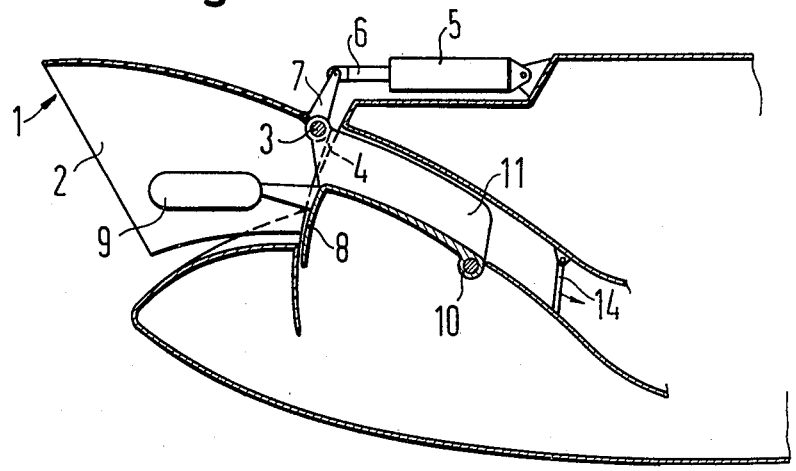
FIG. 1 shows a cutaway side view of a damping body which is arranged at the inlet opening of a cleaning ship.
Figure 2:
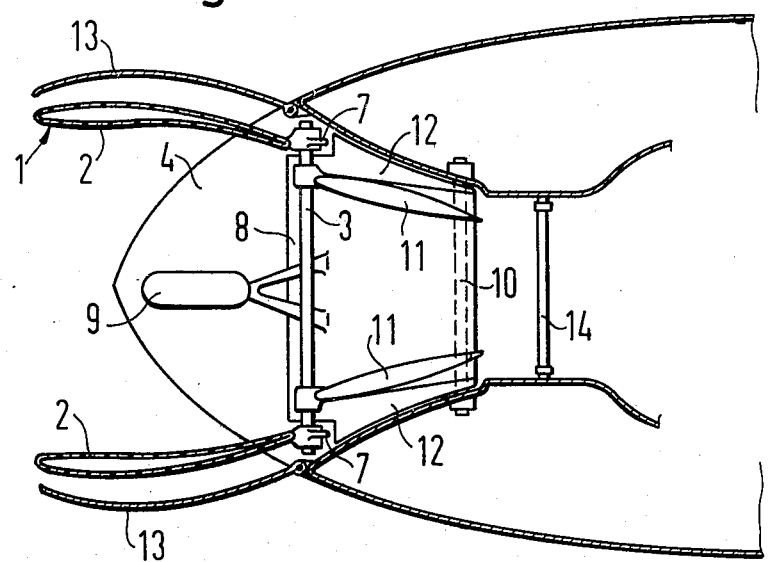
FIG. 2 is a top view of the arrangement according to FIG. 1.

FIGS. 1 and 2 illustrate the front part of a cleaning ship on which is arranged the device according to the invention for damping the oncoming water waves. This device contains a damping body 1 having a longitudinal section corresponding to the shape of part of a damped sinusoidal wave. Damping body 1 is arranged pivotably around an axis 3. The oscillating movements of the damping body are damped by a damping piston running in a cylinder 5. Piston rod 6 of the damping body engages here on a lever arm 7 which is connected to damping body 1 and similarly arranged pivotably around axis 3. Damping body 1 and cylinders 5 are firmly connected to a peeling body 8 at the inlet opening of the cleaning ship. Said peeling body 8 serves to adjust the thickness of the coat of water to be peeled off. For this purpose peeling body 8 is connected to floating bodies 9. Peeling body 8 is furthermore arranged pivotably, namely around an axis 10. Peeling body 8 being pivotable around axis 10 is connected to the damping body via streamlined bodies 11. Axis 3 of the damping body is thus mounted on streamlined bodies 11. Floats 9 on the front edge of peeling body 8 fix a certain peeling thickness. Further, both longisdes of the peeling body are provided with seals 12 serving to seal the body off against the ship parts.

Figure 3:
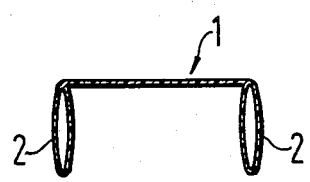
FIG. 3 shows a section of the damping body with attached floating bodies transversely to the flow direction of the water.

Damping body 1 is furnished with side parts 2 which are designed as floating bodies and laterally limit inlet opening 4. Said floating bodies are so designed and the buoyancy of them is such that the weight of damping body 1 is immersed by rougly half. A section transverse to the flow direction of the water through floating bodies 2 and damping body 1 is illustrated in FIG. 3.

When a wave approaches, the buoyancy of the floating bodies is intensified and the front edge of the damping body is raised. As a result of the inertia of the damping body which can be intensified by the controllable damping piston in cylinder 5, the oscillation of the entire structure consisting of damping body 1 and peeling body 8 will lag to such an extent that the front edge or top edge of damping body 1 just about reaches the level of the full wave amplitude on passing through that amplitude. The natural oscillation of the wave oscillation can be adapted and the ship's movement balanced out by the alteration of the damping effect of the damping piston running in cylinder 5.

The device according to the invention for damping the surge may be made of metal, plastics or inflatable rubber fabric. In the case of the metal and plastics models the device can be so designed that it can be either folded backwards onto the deck or mounted detachably for storage on deck. The inflatable design affords the advantage that it can be matched to quay walls and corners.

FIG. 2 shows that damping body 1 and the attached floating bodies 2 are arranged between the folded bow parts 13 of the cleaning ship.

A further advantage of the device according to the invention consists in the fact that as a result of the different degrees of adhesion of oil and water to surfaces the oil adheres better to the fin of the damping body than water after the formation of a boundary layer, which means that the oil surface is separated off in advance and closed before it even runs into the inlet opening of the cleaning ship.

A flap 14 that can be swivelled in one direction is provided so that the water which has flowed into the ship's body cannot flow back out again. Flap 14 can swivel only in the direction of the inflowing water.

I claim:

1. A floating body for cleaning polluted water having a device for damping the surge of water waves comprising an inlet opening in said floating body, an outrigger pivotally mounted on said floating body in front of said inlet opening, said outrigger being fully or partly immersable in water and including a damping body having a portion which extends substantially parallel to the surface of the water, means mounted on the floating body and connected to said damping body for damping the oscillating movements of said damping body caused by said water waves, a peeling body pivotally mounted in said inlet opening of said floating body, floating means connected to said peeling body in front of said inlet opening, and means pivotally connecting said outrigger to said peeling body.

2. The floating body of claim 1 in which said portion of said damping body has the shape of a damped sinusoidal wave in its longitudinal direction.

3. The floating body of claim 1 and further comprising floating bodies attached to said damping body.

4. The floating body of claim 3 in which approximately half of said damping body is immersable in said water.

5. The floating body of claim 1 and further comprising means for pivotally mounting said outrigger so that it can be pivoted back onto said floating body.

6. The floating body of claim 1 in which the axis on which said outrigger is pivoted is approximately on the same level as the upper edge of said inlet opening.

7. The floating body of claim 1 in which said damping means comprises the combination of a piston and cylinder.

8. The floating body of claim 1 in which said damping body is connected to said peeling body by streamlined means.

* * * * *